(12) United States Patent
Boctor et al.

(10) Patent No.: US 7,721,834 B2
(45) Date of Patent: May 25, 2010

(54) PREVENTION OF INADVERTENT INERTIAL ENGAGEMENT OF A TRANSFER CASE CLUTCH

(75) Inventors: Ramy Boctor, Canton, MI (US); Ashok Rodrigues, Farmington Hills, MI (US); Alan Dona, Huntington Woods, MI (US); Matt Todd, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 718 days.

(21) Appl. No.: 11/474,219

(22) Filed: Jun. 23, 2006

(65) Prior Publication Data

US 2007/0295548 A1 Dec. 27, 2007

(51) Int. Cl.
*B60K 17/354* (2006.01)

(52) U.S. Cl. .................. 180/182; 180/247; 180/248; 180/249; 701/89

(58) Field of Classification Search ................ 180/182, 180/247, 248, 249; 701/89
See application file for complete search history.

(56) References Cited

U.S. PATENT DOCUMENTS 6,834,225 B1 * 12/2004 Jiang et al. ................... 701/67
6,945,909 B2 * 9/2005 Maekawa .................... 477/175
2005/0177295 A1 * 8/2005 Rodrigues et al. ............. 701/67

* cited by examiner

*Primary Examiner*—Lesley Morris
*Assistant Examiner*—Jacob Knutson
(74) *Attorney, Agent, or Firm*—David B. Kelley; MacMillan, Sobanski & Todd, LLC

(57) ABSTRACT

A method for controlling operation of a transfer case in a motor vehicle driveline that includes by an engine controlled by a throttle having a variable position, and a transmission driveably connected to the engine for producing multiple ratios of the speed of a transmission input relative to the speed of a transmission output. The transfer case transmitting rotating power in response to an electric signal applied to a clutch. The method includes determining that the engine throttle position is less than a first reference throttle position during a period of predetermined length; determining that a speed of the vehicle speed is in a predetermined range; determining that the transmission is operating in a speed ratio greater than a reference speed ratio; determining that the engine throttle position is greater than a first reference throttle position; and increasing the torque capacity of the clutch for a predetermined period.

20 Claims, 3 Drawing Sheets

PREVENTION OF INADVERTENT INERTIAL ENGAGEMENT OF A TRANSFER CASE CLUTCH

BACKGROUND OF THE INVENTION

The preferred embodiment relates generally to a strategy for controlling a motor vehicle. More particularly, it pertains to electronically detecting potential inertial transfer case engagements in two wheel drive (2WD) mode and manipulating a transfer case clutch to eliminate harshness.

Some four wheel drive (4WD) systems use a ball ramp mechanism to transmit rotary power to a secondary driveline while continuing to transmit power to a primary driveline. Such drive systems are intended to be activated electronically, but sudden accelerations of the input shaft can activate a torque transfer mechanism due to inertial effects. If the system is operating in 2WD mode, this activation can cause a rapid acceleration of the secondary driveline, resulting in a sharp, objectionable noise, called clunk.

During tip-ins from a coasting state at higher speeds while operating in 2WD mode, the transfer case clutch may inadvertently engage and cause a significant clunk. Addressing the clunk through mechanical methods can decrease torque capacity of the 4WD system, increase parasitic losses, and/or make the system slower and more difficult to control. Alternatively, increasing the amount of drag in the transfer case clutch system to prevent the secondary driveline from slowing enough to produce a clunk necessarily increases parasitic losses and decreases vehicle fuel economy.

There is a need, therefore, to anticipate the likely occurrence of a clunk in a transfer case due to this cause, to detect electronically the conditions under which such a clunk is likely to occur, and to take corrective action to avoid its occurrence without compromising vehicle fuel economy, diminishing control responsiveness, or increasing parasitic losses.

SUMMARY OF THE INVENTION

A control strategy for this purpose monitors the operating modes, 2WD and 4WD, engine throttle position, the time rate of change of throttle position, vehicle speed and the current transmission gear to determine if a transfer case clunk is likely to occur. It then activates a transfer case clutch at a minimum level and duration necessary to eliminate the clunk while having minimal effect on parasitic losses.

When the required conditions are detected, the control delays for a period of predetermined length, and then produce a step increase to a predefined duty cycle that is applied to the clutch for a brief period of predetermined length. This action results in a transient increase in torque applied to the secondary power path through the clutch, which prevents inadvertent engagement of the clutch when a tip-in occurs shortly after a coast condition.

According to a preferred embodiment, a method for controlling operation of a transfer case in a motor vehicle driveline that includes an engine controlled by a throttle having a variable position, and a transmission driveably connected to the engine for producing multiple ratios of the speed of a transmission input relative to the speed of a transmission output. The transfer case transmits rotating power in response to an electric signal applied to a clutch. The method includes determining that the engine throttle position is less than a first reference throttle position during a period of predetermined length; determining that a speed of the vehicle speed is in a predetermined range; determining that the transmission is operating in a speed ratio greater than a reference speed ratio; determining that the engine throttle position is greater than a first reference throttle position; and increasing the torque capacity of the clutch for a predetermined period.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
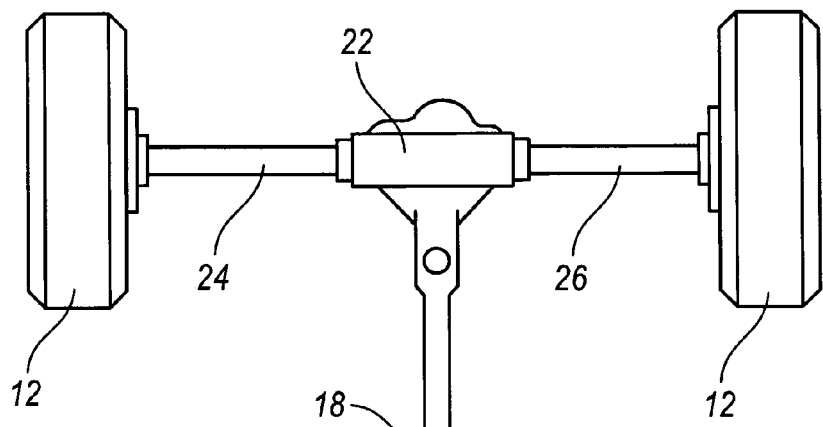
FIG. 1 is a top view of a motor vehicle driveline that includes a transmission, transfer case, front and rear drive shafts, and shafts extending to front wheels and rear wheels.
Figure 1:
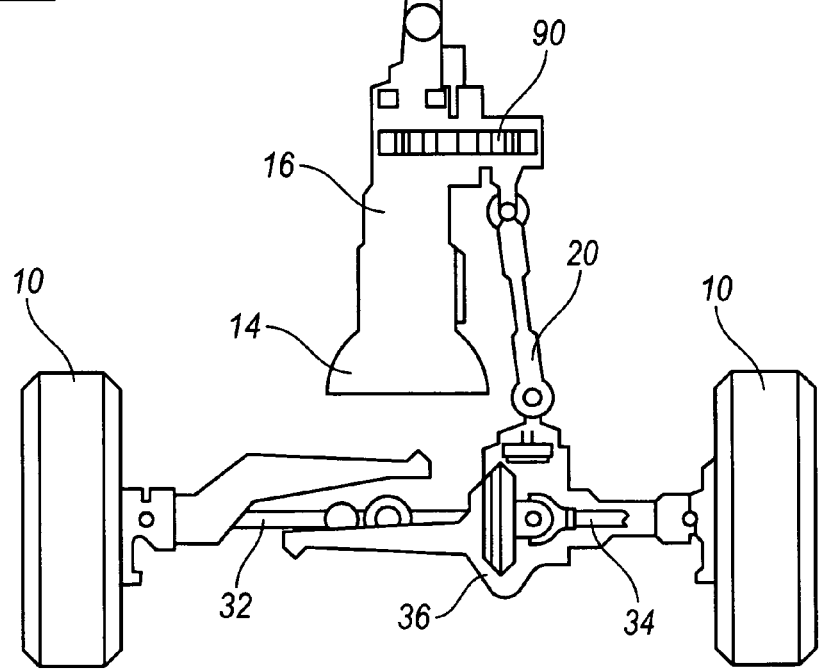

With reference now to the drawings and particularly to FIG. 1, the powertrain of a motor vehicle, to which the present invention can be applied, includes front and rear wheels 10, 12, a power transmission 14 for producing multiple forward and reverse speed ratios driven by an engine (not shown), and a transfer case 16 for continuously driveably connecting the transmission output to a rear drive shaft 18. The transfer case 16 selectively connects the transmission output to both the front drive shaft 20 and rear drive shaft 18 when a four-wheel drive mode of operation is selected, either manually or electronically. Shaft 18 transmits power to a rear wheel differential mechanism 22, from which power is transmitted differentially to the rear wheels 12 through axle shafts 24, 26, which are contained within a differential housing. The front wheels are driveably connected to right-hand and left-hand halfshafts 32, 34, to which power is transmitted from the front drive shaft 20 through a front differential mechanism 36.

The transfer case assembly 16 continually transmits rotating power to the rear driveshaft 18 and rear wheels 12, which is the primary power path. The transfer case 16 intermittently transmits rotating power to the front driveshaft 20 and the front wheels 10, which is the secondary power path, when a clutch, located in the transfer case, is actuated.

Figure 2:
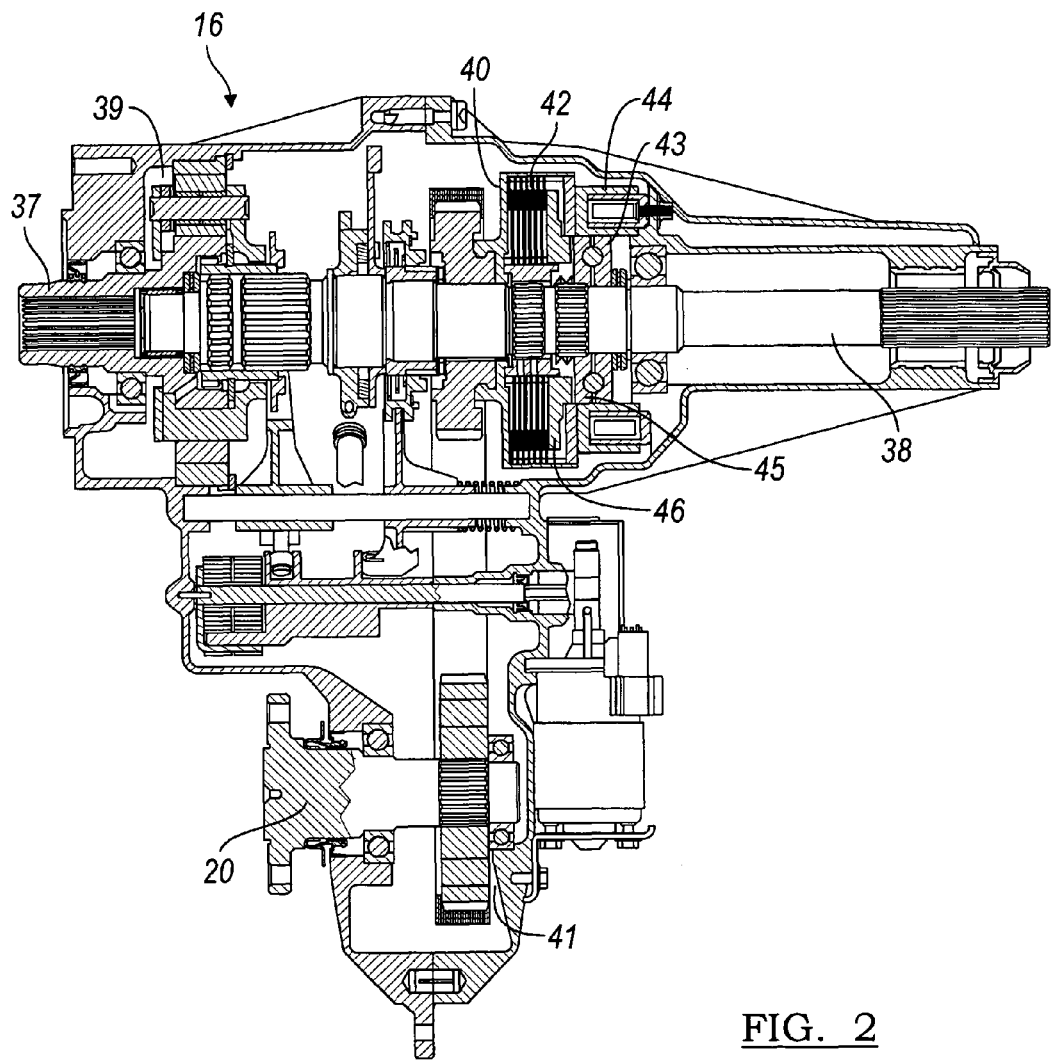
FIG. 2 is a cross section of a mechanism for transmitting torque in the transfer case.

FIG. 2, a cross section of the transfer case 16, shows a transmission output shaft 37, a main shaft 38, driveably coupled to shaft 37 through a speed reduction gear set 39, a first sprocket wheel 40 supported on shaft 38, and a second sprocket wheel 41, driveably connected by a chain to the first sprocket wheel. Main shaft 38 is driveably connected by a spline to the rear driveshaft 18. Sprocket wheel 41 is driveably connected to the front drive shaft 20.

The housing and an outer set of clutch plates of a multi-plate friction clutch 42 are splined to sprocket wheel 40. An inner set of friction plates, interleaved with the plates of the outer set, are splined to main shaft 38. Therefore, the inner set of plates rotate with the rear driveshaft 18, and the outer set of plates rotate with the front driveshaft 20.

One half 43 of a ball-cam mechanism is secured to the housing of an electric coil 44, which is concentric with the central axis and encircles the main shaft 38. The other half 45 of the ball-cam mechanism is splined to the main shaft 38.

When the coil 44 is deenergized, a clutch apply plate 46, located adjacent the clutch 42, is spaced from the ball-cam mechanism, and no torque is transmitted from main shaft 38 to the front drive shaft 20 through clutch 42 and the sprocket wheels 40, 41. All of the torque is transmitted to the rear drive shaft 18 from main shaft 38. But when coil 44 is energized, the ball-cam mechanism 43, 45 forces the apply plate 46 against the clutch, forcing the inner and outer plates into frictional engagement and transmitting torque to the front driveshaft 20 through clutch 42 and the sprocket wheels 40, 41.

When the directional sense of torque carried by the main shaft is reversed, as occurs when the vehicle operator tips-in, i.e., abruptly depresses the accelerator pedal, after a coast condition, driveline lash causes clunk in the transfer case mechanism. The driveshaft lash causes the ball-cam mechanism to index which causes clunk.

Figure 3:
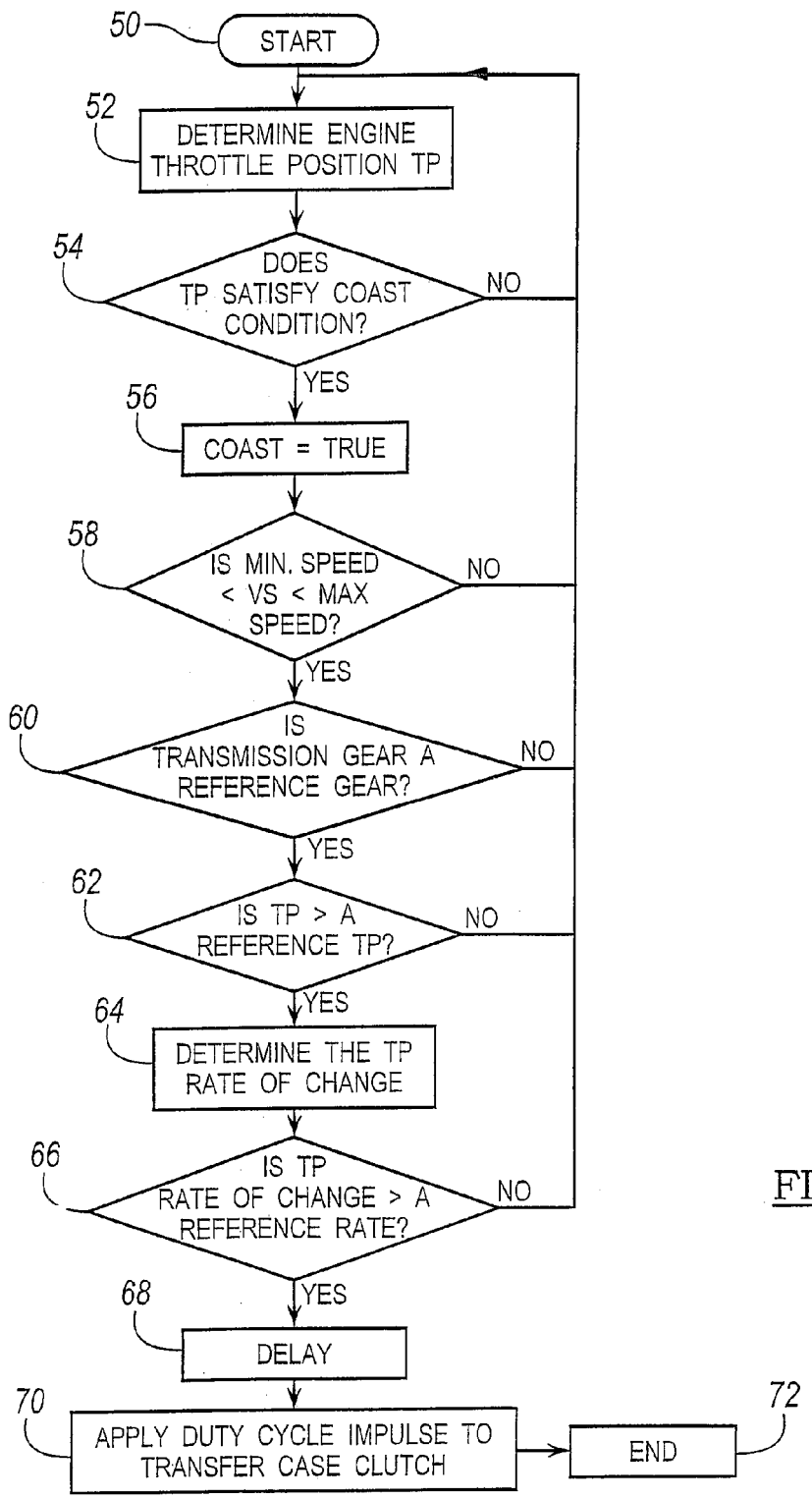
FIG. 3 is a logic diagram of the method for controlling the actuating mechanism of the transfer case to avoid driveline clunk.

Refer now to FIG. 3 where a method for controlling the actuating mechanism of the transfer case 16 to avoid driveline clunk is set forth. Preferably, the data communications occurs with CAN messages using a universal bus protocol.

At step 50, the control strategy is entered provided the ignition key is ON and the transfer case mode selector is in the 4×2 position, i.e. power is transmitted to the rear wheels only. The throttle position TP is determined at step 52. At step 54, a test is made to determine whether the current throttle position is less than a first predetermined throttle position (about 5% of the full throttle pedal range of displacement) for a first predetermined period length (about 100 ms). If the test at step 54 is logically true, a coast condition is detected and a coast flag is set at step 56. Numbers cited here and representing the magnitudes of specific variables and parameters for a particular application are calibratable and subject to wide variation in other applications from the magnitudes mentioned here.

If Coast=True, control passes to step 58 where the current vehicle speed, preferably represented by the speed of the rear driveshaft 18, is compared to a minimum vehicle speed (about 35 kph) and to a maximum speed (about 60 kph) to determine whether the vehicle speed in the range between the minimum and maximum speeds. If the test at 58 is true, the current gear in which the transmission is operating is compared at step 60 to a reference gear to determine whether the current gear is higher than the reference gear. The reference gear is preferably second gear. If the test at 60 is true, the engine throttle position, preferably as represented by the duty cycle applied to the solenoid that actuated the engine throttle, is compared at 62 to a reference throttle duty cycle. The reference duty cycle is about 60%.

If a coast condition is detected at step 56 and the tests at steps 58, 60, 62 are true, control passes to step 64 where the time rate of change of throttle position is determined over several intervals, preferably about 20 ms, 40 ms and 80 ms. At step 66, the strategy compares the time rate of change of throttle position over one or all of the intervals to a corresponding a reference TP rate. Preferably, the reference TP rate of change for the 20 ms interval is about 4%; for the 40 ms interval, about 6%; and for the 80 ms interval, about 8%.

If the test at step 66 is true, control passes to step 68 where a delay occurs for a predetermined period of about 100 ms to minimize the length of the transfer clutch actuation. Then, at step 70, a duty cycle impulse is applied to coil 44 by increasing in a step the coil duty cycle to about 14% for a period of about 400 ms, after which the duty cycle is reduced in a step to 0%. Alternatively, if a coast condition is detected at step 56 and the tests at steps 58 and 60 are true, the test at step 62 may be deleted, whereupon control passes to steps 64 and 66, as described above. In this case, the duty cycle impulse is applied to coil 44 after comparing the time rate of change of the engine throttle duty cycle to a reference rate of change, but without comparing the engine throttle position to reference throttle position. In either case, the control algorithm is exited at step 72.

The control, therefore, produces a transient increase in torque applied to the secondary power path through the clutch, which prevents inadvertent engagement of the clutch and avoids clunk when a tip-in occurs shortly after a coast condition.

Any yaw-control, roll-control or anti-lock brake system event, preferably, would supersede the output of this control strategy. If a shift into the 4×4 mode is commanded, this strategy can be aborted at any point after the clutch activation part of the 4×4 shift occurs. However, this strategy should not be aborted during the switch debounce period, which is a brief period (usually a few tenths of a second) after which a switch is moved and during which the system takes no action. The switch debounce period is provided in case the vehicle operator has a change-of-mind or is still in the process of moving the switch to another state.

References throughout the description of the control strategy and the claims to engine throttle position indicates that the motor vehicle is equipped with an electronic throttle system, in which a microprocessor controls the engine throttle opening or position as a function of vehicle speed, accelerator pedal position, the time rate of change of accelerator pedal position, and other variables, rather than by accelerator pedal position alone. However, the control strategy is applicable also to vehicles in which the engine throttle position is mechanically connected directly to the accelerator pedal. Therefore, references to "engine throttle position" are interchangeable with "accelerator pedal position."

Although the powertrain of the vehicle is described with reference to one in which the rear wheels are in a primary power path and the front wheels are in a secondary power path, the control strategy is also applicable to a powertrain in which the front rear wheels are in the primary power path and the rear wheels are in the secondary power path. Although the control strategy is described here for operation in the 4×2 mode to prevent clunk due to lash in a rear wheel power path, the strategy can be applied also to prevent clunk due to lash in either the front or rear wheel power paths.

In accordance with the provisions of the patent statutes, the preferred embodiment has been described. However, it should be noted that the alternate embodiments can be practiced otherwise than as specifically illustrated and described.

What is claimed is:

1. A method for controlling a motor vehicle transfer case, comprising:
   (a) operating the vehicle in a coast condition with power transmitted to a first wheel set and vehicle speed in a predetermined range;
   (b) changing a position of the vehicle's engine throttle at a rate greater than a reference rate;
   (c) producing an impulse increase in torque capacity of a clutch that transmits power to a second wheel set and reducing said capacity to zero.

2. The method of claim 1, further including the step of:
   determining that the engine throttle position is less than a reference throttle position during a period of predetermined length, before executing step (c).

3. The method of claim 1, further including the step of:
determining that a transmission is operating in a gear higher than a reference gear, before executing step (c).

4. The method of claim 1, wherein step (b) further comprises:
determining that the rate of change of the engine throttle is greater than the reference time rate of change a first period having a first length.

5. The method of claim 1, further including the steps of:
before executing step (c), determining that a of change of the engine throttle is greater than a first reference rate of change during a first period; and
before executing step (c), determining that a rate of change of the engine throttle is greater than second reference rate of change greater than the first reference rate of change, during a second period longer than the first period.

6. The method of claim 1, further including the step of:
delaying for a predetermined period the step of increasing the torque capacity of the clutch after steps (a) and (b) are executed.

7. A method for controlling operation of a motor vehicle transfer case, comprising the steps of:
(a) operating the vehicle in a coast condition with power transmitted to first vehicle wheels;
(b) determining that vehicle speed is in a predetermined range;
(c) determining that a transmission of the vehicle is operating in a gear ratio greater than a reference gear ratio;
(d) determining that a rate of change of an engine throttle of the vehicle is greater than a reference rate of change;
(e) after a delay following step (d), producing an impulse increase in torque capacity of a clutch that transmits power to second vehicle wheels followed by a decrease to substantially zero torque capacity.

8. The method of claim 7, further including the step of:
determining that the rate of change of the engine throttle is greater than a first reference rate of change during a first period having a first length, before executing step (e).

9. The method of claim 7, further including the steps of:
before executing step (e), determining that a of change of the engine throttle is greater than a first reference rate of change during a first period; and
before executing step (e), determining that a rate of change of the engine throttle is greater than second reference rate of change greater than the first reference rate of change, during a second period longer than the first period.

10. The method of claim 7, further including the steps of:
before executing step (e), determining that a of change of the engine throttle is greater than a first reference rate of change during a first period; and
before executing step (e), determining that a rate of change of the engine throttle is greater than second reference rate of change greater than the first reference rate of change, during a second period longer than the first period; and
before executing step (e), determining that a rate of change of the engine throttle is greater than a third reference rate of change greater than the second reference rate of change, during a third period longer than the second period.

11. A system for controlling the transmission of rotating power in a vehicle to primary and secondary power paths, comprising:
an engine and engine throttle;
a transmission including an input driveably connected to the engine and an output, for producing multiple ratios of the speed of the input relative to the speed of the output, each ratio associated with a gear;
a transfer case driveably connected to the output for transmitting rotating power to the primary and secondary power paths;
a clutch alternately opening and closing a drive connection between the output and the secondary power path; and
a controller configured to detect the vehicle operating in a cruise condition and two wheel drive, vehicle speed being in a predetermined range, and a rate of change of an engine throttle being greater than a reference rate of change, and to produce an impulse increase in torque capacity of a clutch that transmits power to a second wheel set, and to produce a decrease in said torque capacity to substantially zero.

12. The system of claim 11, wherein the clutch is an electromagnetic clutch having a torque capacity that changes in response to a command signal.

13. The system of claim 11, wherein the controller is further programmed to detect the engine throttle being less than a reference throttle position during a period of predetermined length.

14. The system of claim 11, wherein the controller is further programmed to detect the transmission operating in a gear higher than a reference gear.

15. The system of claim 11, wherein the controller is further programmed to detect the rate of change of the engine throttle being greater than a reference time rate of change during a first period.

16. The system of claim 11, wherein the controller is further programmed to detect:
a rate of change of the engine throttle greater than a first reference rate of change during a first period; and
a rate of change of the engine throttle being greater than a second reference rate of change the first reference rate of change during a second period longer than the first period.

17. A method for controlling motor vehicle transfer case comprising the steps of:
(a) operating the vehicle in a coast condition with power transmitted to first vehicle wheels;
(b) determining that a speed of the vehicle is in a predetermined range;
(c) determining that a transmission of the vehicle is operating in a higher gear ratio than a reference gear ratio;
(d) determining that a rate of change of an engine throttle of the vehicle is greater than a first reference rate of change;
(e) determining that an engine throttle position is greater than a reference throttle position during a first period;
(f) after a delay following step (e), producing an impulse increase in torque capacity of a clutch that transmits power to second vehicle wheels followed by a decrease to substantially zero torque capacity.

18. The method of claim 17, further including the step of:
before executing step (f), determining that a rate of change of the engine throttle is greater than a second reference rate of change greater than the first reference rate of change during a second period longer than the first period.

19. The method of claim 17, further including the steps of:
before executing step (f), determining that a rate of change of the engine throttle is greater than second reference time rate greater than the first reference rate of change during a second period longer than the first period; and before executing step (f), determining that a rate of change of the engine throttle is greater than a third reference time rate of change greater than the second reference rate of change during a third period longer than the second period.

20. The method of claim 1, further including the step of determining that an engine throttle position is greater than a reference engine throttle position, before executing step (c).

* * * * *